(12) United States Patent
Huang

(10) Patent No.: US 7,375,976 B2
(45) Date of Patent: May 20, 2008

(54) HOUSING FOR COMMUNICATION APPARATUS CAPABLE OF INSTALLING LED LAMPS HAVING HORIZONTAL OR VERTICAL EMITTING DIRECTION THEREIN, AND COMMUNICATION APPARATUS COMPRISING THE SAME

(75) Inventor: Wen-Liang Huang, Taipei County (TW)

(73) Assignee: Askey Computer Corp., Taipei (TW)

( * ) Notice: Subject to any disclaimer, the term of this patent is extended or adjusted under 35 U.S.C. 154(b) by 172 days.

(21) Appl. No.: 11/327,517

(22) Filed: Jan. 9, 2006

(65) Prior Publication Data

US 2007/0097657 A1  May 3, 2007

(51) Int. Cl.
*H05K 5/00* (2006.01)

(52) U.S. Cl. .................. 361/752; 361/790; 361/800; 200/237; 200/308

(58) Field of Classification Search ............... 361/752, 361/790, 797, 800; 200/237, 308, 313; 439/611; 313/49, 51, 317, 318
See application file for complete search history.

(56) References Cited

U.S. PATENT DOCUMENTS

| 6,683,292 | B1 * | 1/2004 | Charng .................. 250/205 |
| 6,816,389 | B1 * | 11/2004 | Lutz et al. .............. 361/801 |
| 6,902,308 | B2 * | 6/2005 | Love ...................... 362/545 |
| 2005/0169598 | A1 * | 8/2005 | Tung et al. ............. 385/146 |

* cited by examiner

*Primary Examiner*—Tuan T. Dinh
*Assistant Examiner*—Hung S Bui
(74) *Attorney, Agent, or Firm*—Bacon & Thomas, PLLC

(57) ABSTRACT

A communication apparatus includes a housing and an electronic device installed in the housing. The housing has a shell body having a top wall, a front wall and a mounting zone defined by a part of the top wall and a part of the front wall, and a cover coupled to the mounting zone. The mounting zone is provided with a first row of through holes and a second row of through holes. The cover has a row of light-guiding rods at a back side thereof, which are respectively selectively insertable into the first or second row of through holes. The electronic device includes a circuit board and a plurality of lamps electrically connected to and controlled by the circuit board.

8 Claims, 5 Drawing Sheets

US 7,375,976 B2

HOUSING FOR COMMUNICATION APPARATUS CAPABLE OF INSTALLING LED LAMPS HAVING HORIZONTAL OR VERTICAL EMITTING DIRECTION THEREIN, AND COMMUNICATION APPARATUS COMPRISING THE SAME

BACKGROUND OF THE INVENTION

1. Field of the Invention

The present invention relates to a housing for a communication apparatus and more particularly, to such a housing for a communication apparatus, which allows installation of LED lamps having different light-emitting directions, and a communication apparatus comprising the housing.

2. Description of the Related Art

A communication apparatus, such as cable modem or ADSL modem, has LED lamps installed in an electronic device inside the housing for different indications, for example, power on/off indication, error message indication, etc.

The LED lamps of regular communication apparatus may be installed in the circuit board in a horizontal position in parallel to the circuit board such that the light of the LED lamps can emit forwardly and horizontally, or a vertical position perpendicular to the circuit board such that the light can emit upwardly and vertically. To fit the emitting direction of the LED lamps, a different housing shall be used, i.e., the manufacturer shall have to provide two different housings to fit horizontal LED lamps and vertical LED lamps respectively. Preparing different housings require different molds, resulting in a high manufacturing cost.

Further, preparing a same kind of communication apparatus in two different models having horizontal LED lamps or vertical LED lamps complicates the inventory control and relatively increases the inventory cost.

SUMMARY OF THE INVENTION

The present invention has been accomplished under the circumstances in view. It is one object of the present invention to provide a communication apparatus, which allows installation of LED lamps having different light-emitting directions, thereby saving much tool cost.

It is another object of the present invention to provide a communication apparatus, which comprises a housing that allows to house different types of indicator lamps having different light-emitting directions, thereby saving much inventory cost of the housing.

To achieve these objects of the present invention, the communication apparatus comprises a housing having shell body and a cover, and an electronic device installed in the shell body. The shell body has a top wall, a front wall and a mounting zone defined by a part of the top wall and a part of the front wall and extending over a connection area of the top wall and the front wall. The area of the mounting zone at the top wall part is symmetrical to the area of the mounting zone at the front wall part. The mounting zone is provided with a coupling portion. The cover is coupled to the mounting zone of the shell body and provided with a coupling portion corresponding to the coupling portion of the mounting zone. The electronic device includes a circuit board and a plurality of lamps electrically connected to and controlled by the circuit board.

In a preferred embodiment of the present invention, the mounting zone is provided with a first row of through holes and a second row of through holes, which are symmetrically arranged relative to an imaginary line which is an imaginary intersection of the top and front walls of the shell body. In addition, the cover is provided at a back side thereof with a plurality of light-guiding rods which are selectively insertable into the first row of through holes or the second row of through holes.

DETAILED DESCRIPTION OF THE INVENTION

Figure 1:
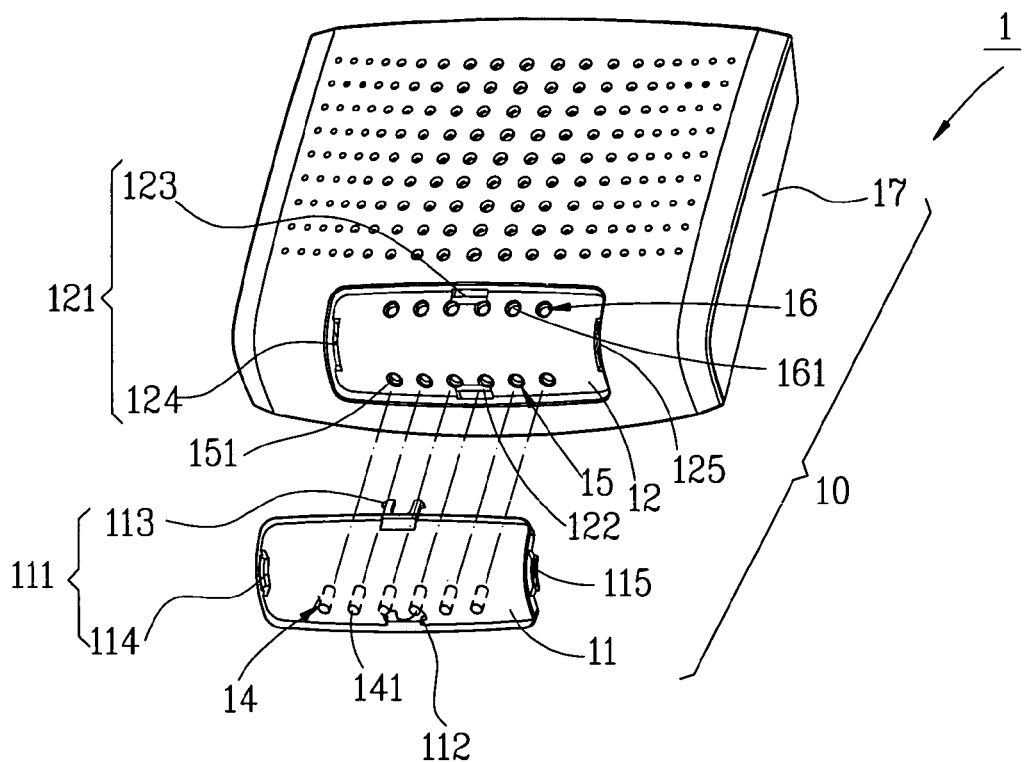
FIG. 1 is an exploded view of a communication apparatus constructed according to a first preferred embodiment of the present invention.
Figure 2:
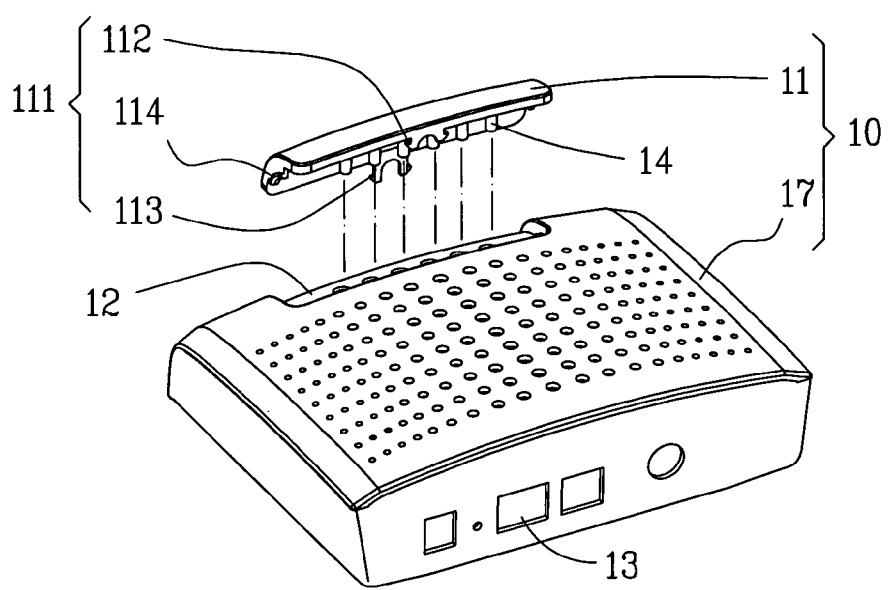
FIG. 2 corresponds to FIG. 1 but showing the cover rotated through 180°.

As shown in FIGS. 1-4, a communication apparatus 1 in accordance with the first preferred embodiment of the present invention comprises mainly a housing 10 and an electronic device 20.

The housing 10 comprises a cover 11 and a shell body 17. The shell body 17 has a mounting zone 12 and a plurality of mounting holes 13. The mounting zone 12 is defined by a part of the top and front walls of the shell body 17 and extends over the corner at the connection area between the top wall and the front wall of the shell body 17. The area of the mounting zone 12 at the top wall, i.e. the top wall part of the mounting zone 12, of the shell body 17 is symmetrical to the area of the mounting zone 12 at the front wall, i.e. the front wall part of the mounting zone 12, of the shell body 17. The mounting zone 12 comprises a coupling portion 121, a first row of holes 15, and a second row of holes 16. The coupling portion 121 is provided with a first coupling hole 122, a second coupling hole 123, a third coupling hole 124 and a fourth coupling hole 125. The first coupling hole 122 and the second coupling hole 123 are symmetrically arranged. The third coupling hole 124 and the fourth coupling hole 125 are symmetrically arranged. The first row of holes 15 includes a plurality of first through holes 151 equally spaced from one another and arranged in a line. The second row of holes 16 includes a plurality of second through holes 161 equally spaced from one another and arranged in a line. The first row of holes 15 and the second row of holes 16 are symmetrically arranged relative to an imaginary line A which is an imaginary intersection of the top and front plans (walls) of the shell body 17, i.e., the first row of holes 15 is arranged at the front wall part of the mounting zone 12 of the shell body 17 and the second row of holes 16 is arranged at the top wall part of the mounting zone 12 of the shell body 17. The distance between the first row of holes 15 and the imaginary line A is equal to the distance between the second row of holes 16 and the imaginary line A. The mounting holes 13 are provided at the rear wall of the shell body 17 for installation of connectors.

Figure 3:
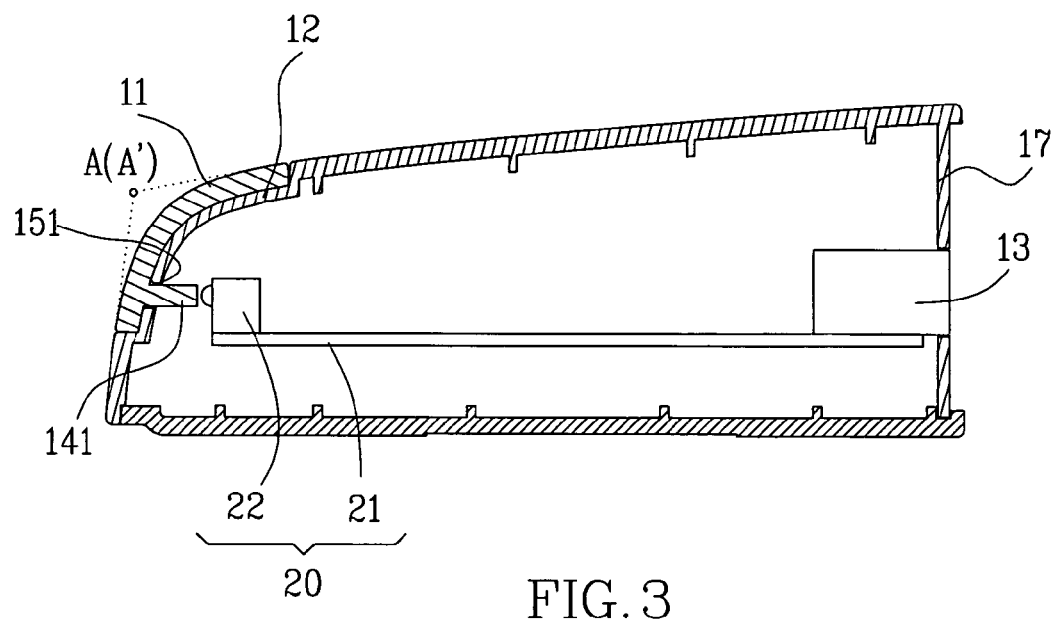
FIG. 3 is a sectional assembly view of FIG. 1, showing that the lamps are installed in the circuit board horizontally.
Figure 4:
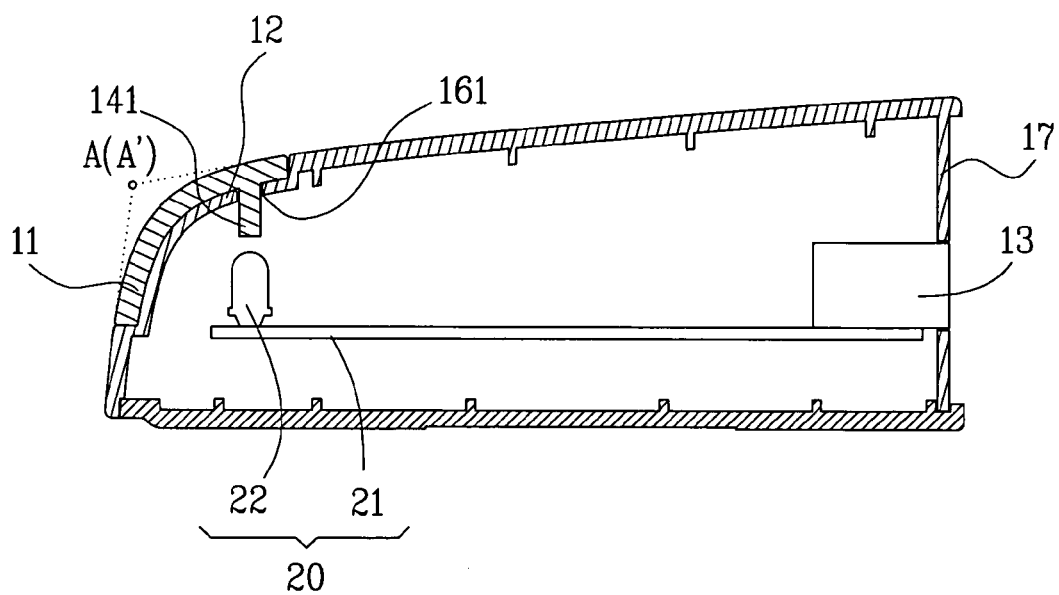
FIG. 4 is similar to FIG. 3 but showing that the lamps are installed in the circuit board vertically.

The cover 11 has a profile fitting the mounting zone 12 at the shell body 17, comprising a coupling portion 111. The coupling portion 111 is provided with a first coupling member 112, a second coupling member 113, a third coupling member 114, and a fourth coupling member 115. The first coupling member 112 and the second coupling member 113 are symmetrically arranged relative to an imaginary line A' which is located at the same place with the imaginary line A. The third coupling member 114 and the fourth coupling member 115 are symmetrically arranged relative to the imaging line A'. The first, second, third and fourth coupling members 112-115 are respectively connectable to the first, second, third and fourth coupling holes 122-125 to secure the cover 11 to the mounting zone 12. The cover 11 has a light-guiding unit 14 arranged along the back side thereof. The light-guiding unit 14 comprises a plurality of light-guiding rods 141 perpendicularly extending from the back side of the cover 11 and spacedly arranged in a row. As shown in FIG. 3, the distance between the imaginary line A' and the row of light-guiding unit 14 is equal to the distance between the imaginary line A and the second row of holes 16. Therefore, when the first, second, third and fourth coupling members 112-115 are fastened to the first, second, third and fourth coupling holes 122-125, the light-guiding rods 141 are respectively inserted into the first through holes 151. When rotated the cover 11 through 180° and fastened the first and second coupling members 112 and 113 to the second and first coupling holes 123 and 122 at the mounting zone 12 and the third and fourth coupling members 114 and 115 to the fourth and third coupling holes 125 and 124 respectively, the light-guiding rods 141 are respectively inserted into the second through holes 161, as shown in FIG. 4.

The electronic device 20 is mounted inside the shell body 17, comprising a circuit board 21 and a plurality of lamps 22. The circuit board 21 controls the operation mode (light emitting mode) of the lamps 22. The lamps 22 are installed in the circuit board 21. According to this embodiment, the lamps 22 are light emitting diode (LED) lamps. Further, the lamps 22 can be installed in the circuit board 21 in a horizontal position in parallel to the circuit board 21, as shown in FIG. 3, or a vertical position perpendicular to the circuit board 21, as shown in FIG. 4. When the lamps 22 are installed in the circuit board 21 in the horizontal position, the lamps 22 are respectively aimed at the first through holes 15. At this time, the light-guiding unit 14 is set in the first through holes 15 to guide the light of the lamps 22 out of the cover 11. On the contrary, when the lamps 22 are installed in the circuit board 21 in the vertical position, the lamps 22 are respectively aimed at the second through holes 16. At this time, the cover 11 is turned through 180° to have the light-guiding unit 14 be set in the second through holes 16 to guide the light of the lamps 22 out of the cover 11.

Referring to FIGS. 1-4 again, the mounting zone 12 defined at the corner of the connection area between the top and front walls of the shell body 17 is smoothly arched, and the cover 11 is smoothly arched to fit the smoothly arched connection area (mounting zone 12) between the top and front walls of the shell body 17. When the electronic device 20 is set to have the lamps 22 aim at the front wall of the shell body 17, the light-guiding unit 14 is set in the first row of holes 15 and aimed at the lamps 22 of the electronic device 20, as shown in FIG. 3. At this time, the first, second, third and fourth coupling members 112-115 of the cover 11 are respectively fastened to the first, second, third and fourth coupling holes 122-125 at the mounting zone 12 to secure the cover 11 to the mounting zone 12. The cover 11 is made of a light-transmissible material. By means of the effect of the light-guiding unit 14, the cover 11 shows the light emitting mode of the lamps 22. Further, when the electronic device 20 is set to have the lamps 22 aim at the top wall of the shell body 17, the cover 11 is rotated through 180° to have the light-guiding unit 14 be set in the second row of holes 16 and aimed at the lamps 22 of the electronic device 20, as shown in FIG. 4. At this time, the first and second coupling members 112 and 113 are respectively fastened to the second and first coupling holes 123 and 122, and the third and fourth coupling members 114 and 115 are respectively fastened to the fourth and third coupling holes 125 and 124.

Figure 5:
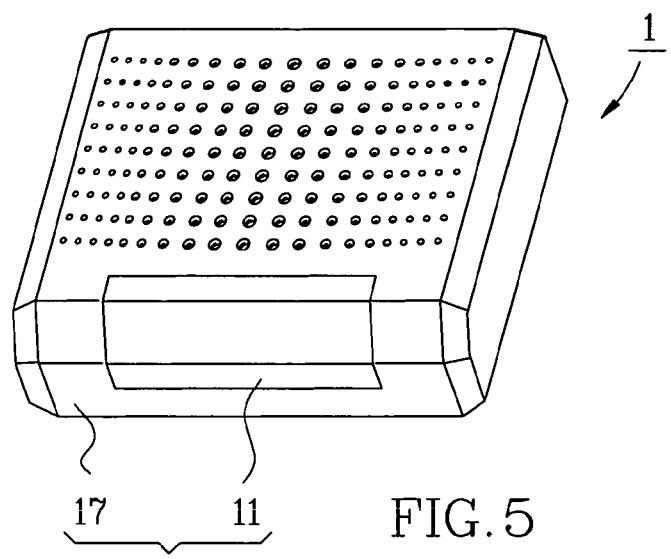
FIG. 5 is a perspective view of a communication apparatus constructed according to a second preferred embodiment of the present invention.
Figure 6:
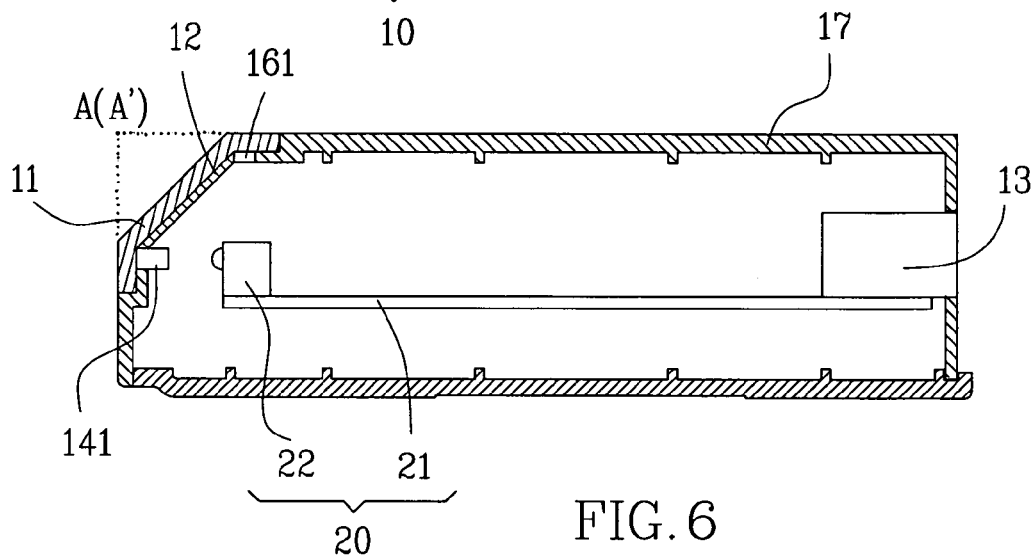
FIG. 6 is a sectional view of the second preferred embodiment of the present invention, showing that the lamps are installed in the circuit board horizontally.
Figure 7:
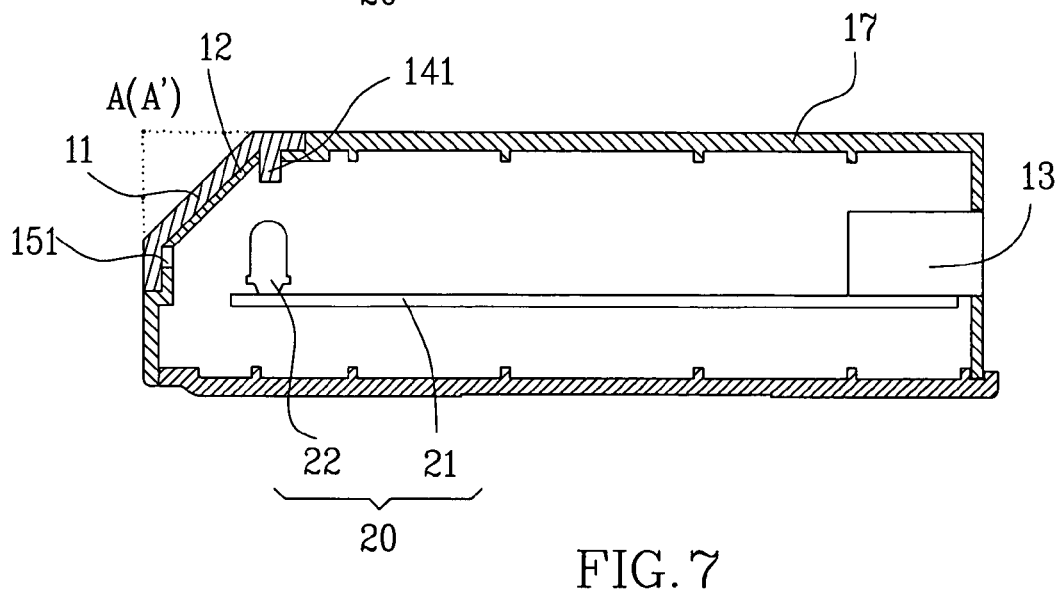
FIG. 7 is similar to FIG. 6 but showing that the lamps are installed in the circuit board vertically.

FIGS. 5-7 show a communication apparatus constructed according to the second preferred embodiment of the present invention. According to this embodiment, the mounting zone 12 is a double-beveled area extending over a part of the top wall of the shell body 17 and a part of the front wall of the shell body 17, and the cover 11 is a double-beveled cover plate fitting the double-beveled mounting zone 12. When the electronic device 20 is set to have the lamps 22 aim at the front wall of the shell body 17, the light-guiding rods 141 are respectively set in the first through holes 151 and aimed at the lamps 22 of the electronic device 20 (see FIG. 6). On the contrary, when the electronic device 20 is set to have the lamps 22 aim at the top wall of the shell body 17, the cover 11 is rotated through 180° to have the light-guiding rods 141 be set in the second through holes 161 and aimed at the lamps 22 of the electronic device 20 (see FIG. 7).

Figure 8:
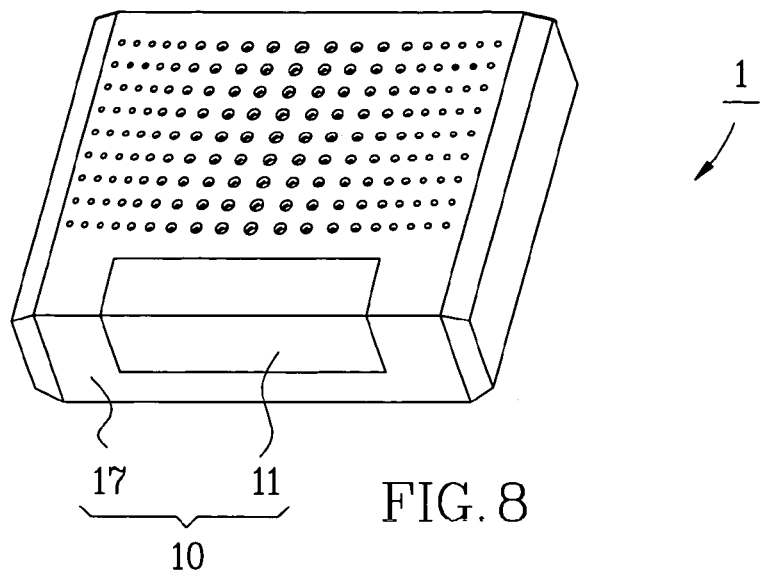
FIG. 8 is a perspective view of a communication apparatus constructed according to a third preferred embodiment of the present invention.
Figure 9:
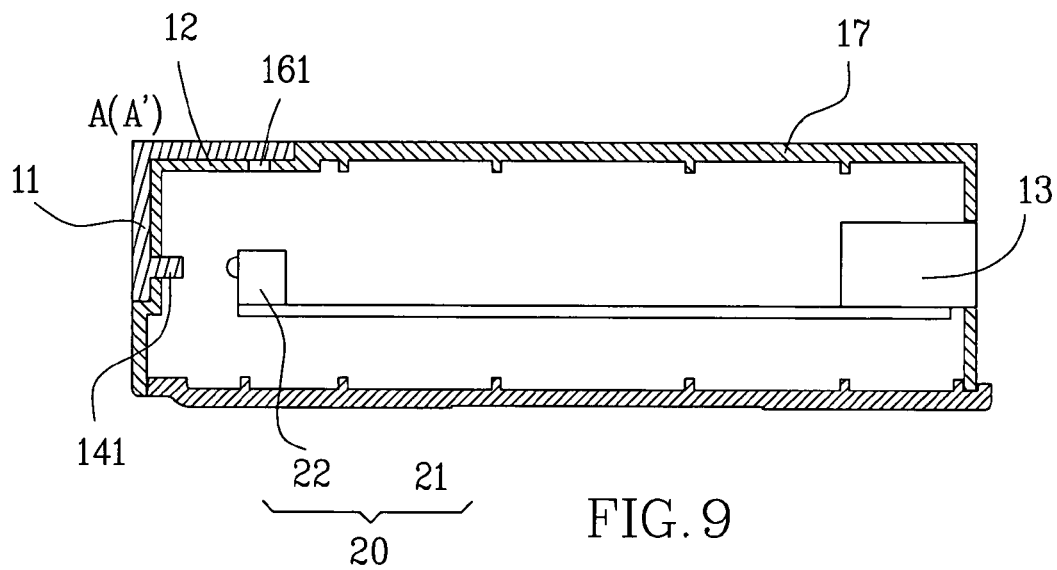
FIG. 9 is a sectional view of the third preferred embodiment of the present invention, showing that the lamps are installed in the circuit board horizontally.
Figure 10:
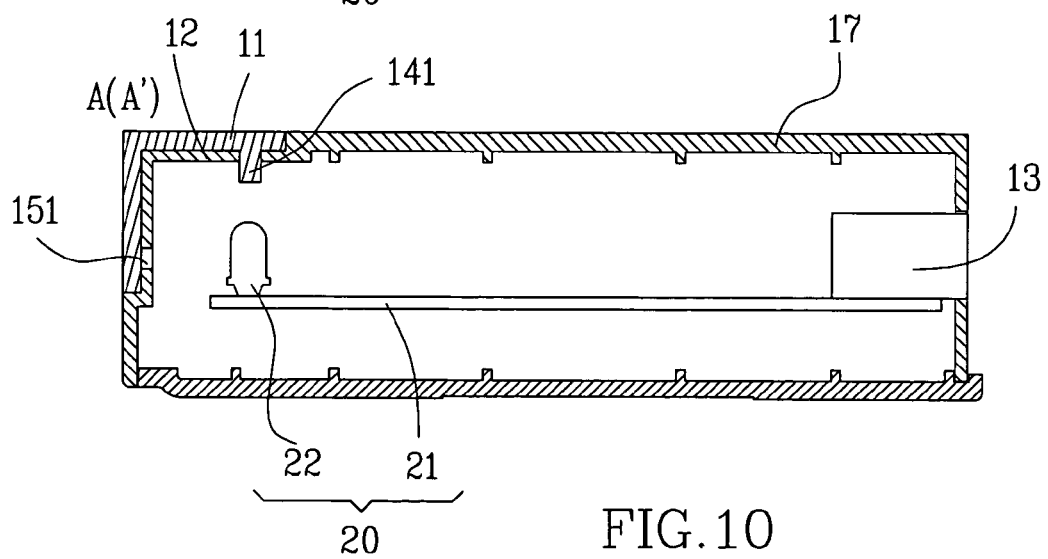
FIG. 10 is similar to FIG. 9 but showing that the lamps are installed in the circuit board vertically.

FIGS. 8-10 show a communication apparatus constructed according to the third preferred embodiment of the present invention. According to this embodiment, the mounting zone 12 is defined at the right-angled corner of the connection area between the top and front walls of the shell body 17 and extends over a part of the top wall of the shell body 17 and a part of the front wall of the shell body 17, and the cover 11 is an L-shaped cover plate fitting the mounting zone 12. When the electronic device 20 is set to have the lamps 22 aim at the front wall of the shell body 17, the light-guiding rods 141 are set in the first through holes 151 and aimed at the lamps 22 of the electronic device 20 (see FIG. 9). On the contrary, when the electronic device 20 is set to have the lamps 22 aim at the top wall of the shell body 17, the cover 11 is rotated through 180° to have the light-guiding rods 14 be set in the second through holes 161 and aimed at the lamps 22 of the electronic device 20 (see FIG. 10).

Figure 11:
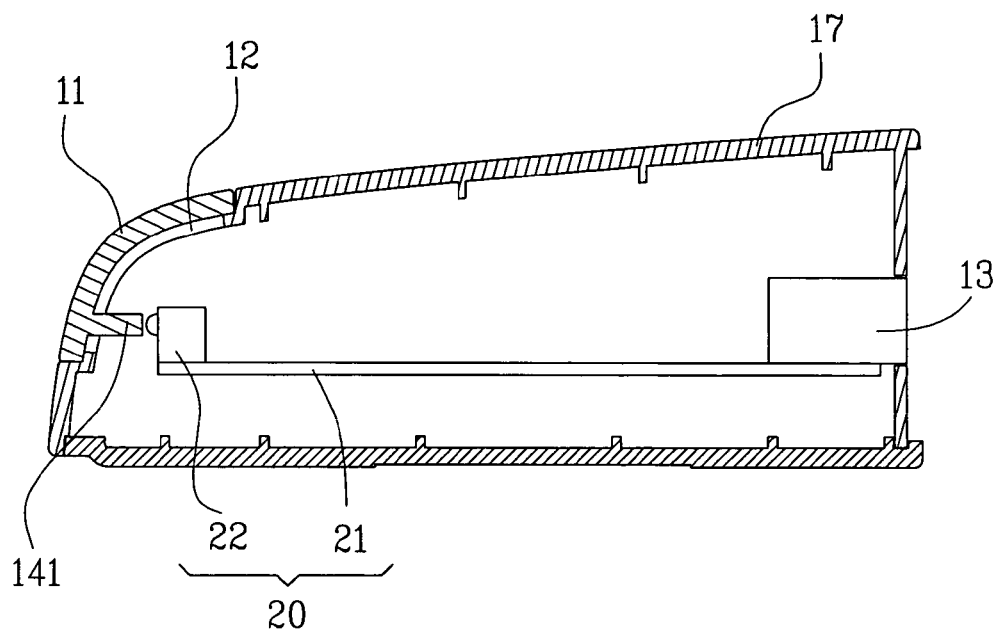
FIG. 11 is a sectional view of a communication apparatus constructed according to a fourth preferred embodiment of the present invention.

FIG. 11 is a sectional view of a communication apparatus constructed according to the fourth preferred embodiment of the present invention. According to this embodiment, the mounting zone 12 has a hollow center area, and the cover 11 is fastened to the mounting zone 12 and blocks the hollow center area of the mounting zone 12. The cover 11 has light-guiding rods 141 suspending in the hollow center area of the mounting zone 12, extending into inside of the shell body 17 and aiming the lamps 22 at the circuit board 21 of the electronic device 20 inside the shell body 17. The cover 11 can be selectively fastened to the mounting zone 12 between two positions subject to the horizontal or vertical mounting position of the lamps 22 at the circuit board 21 of the electronic device 20.

Figure 12:
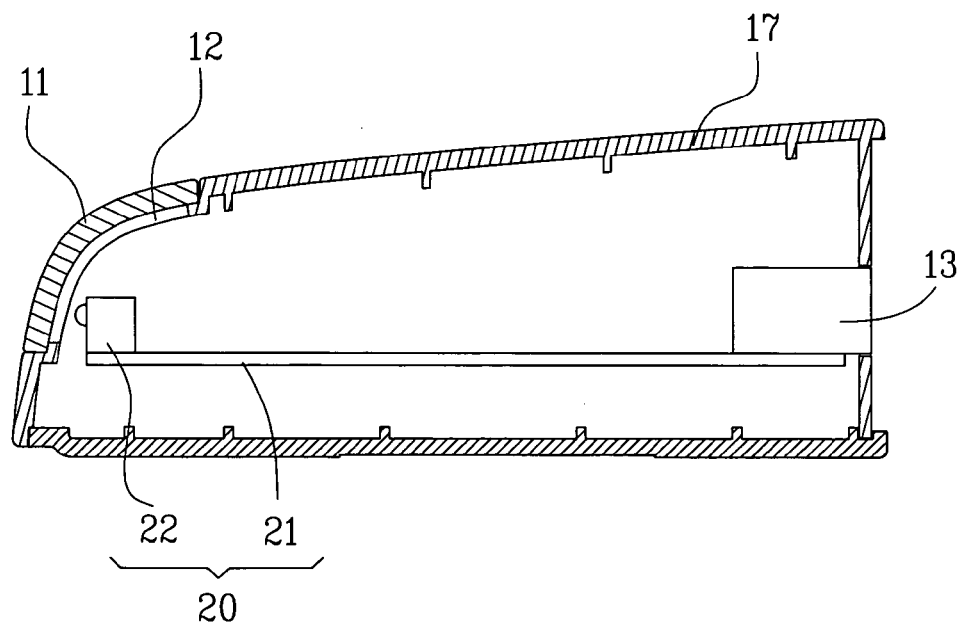
FIG. 12 is a sectional view of a communication apparatus constructed according to a fifth preferred embodiment of the present invention.

FIG. 12 is a sectional view of a communication apparatus constructed according to the fifth preferred embodiment of the present invention. According to this embodiment, the mounting zone 12 has a hollow center area, and the cover 11 is a label bonded to the mounting zone 12 and covered over the hollow center area of the mounting zone 12. The cover 11 is made of a light-transmissible material. Further, the lamps 22 are mounted on the circuit board 21 of the electronic device 20 at one side adjacent to the cover 11. This embodiment eliminates the aforesaid light-guiding unit from the cover 11, and the light of the lamps 22 directly passes through the light-transmissible cover 11.

As indicated above, the cover of the present invention can be installed to the body shell within two postures selectively to meet the vertical or horizontal installation position of the lamps installed inside the shell body, thereby saving the tool cost of preparing different molds of the housing and the inventory cost of storing different types of the housing.

What is claimed is:

1. A communication apparatus comprising an electronic device having a circuit board and at least one lamp electrically connected to said circuit board, and a housing that houses the electronic device, wherein said housing comprises:
    a shell body having a top wall, a front wall and a mounting zone defined by a part of the top wall and a part of the front wall and extending over a connection area of the top wall and the front wall;
    wherein the mounting zone is provided with a coupling portion, and the area of the mounting zone at the top wall part is symmetrical to the area of the mounting zone at the front wall part;
    a cover coupled to the mounting zone of said shell body and provided with a coupling portion corresponding to the coupling portion of said shell body;
    wherein the mounting zone is provided with a first row of through holes that are arranged in a line and formed in the mounting zone at the front wall part and a second row of through holes that are arranged in a line and formed in the mounting zone at the top wall part; and
    wherein the first row of through holes and the second row of through holes are symmetrically arranged relative to an imaginary line which is an imaginary intersection of the top and front walls of said shell body.

2. The communication apparatus as claimed in claim 1, wherein said cover comprises a plurality of light-guiding rods perpendicularly extending from a back side of the cover and spacedly arranged in a row;
    wherein the light-guiding rods are selectively insertable into the first row of through holes or the second row of through holes.

3. The communication apparatus as claimed in claim 1, wherein the mounting zone of said shell body is provided with a hollow center area.

4. The communication apparatus as claimed in claim 1, wherein said cover is a label.

5. The communication apparatus as claimed in claim 1, wherein the coupling portion the mounting zone is provided with at least one coupling hole.

6. The communication apparatus as claimed in claim 1, wherein the coupling portion of said cover is provided with at least one coupling member.

7. The communication apparatus as claimed in claim 1, wherein said at least one lamp is formed of a light emitting diode.

8. A housing for a communication apparatus, the housing comprising:
    a shell body having a top wall, a front wall, and a mounting zone defined by a part of said top wall and a part of said front wall and extending over a connection area of the top wall and the front wall;
    wherein the mounting zone is provided with a coupling portion, and the area of the mounting zone at the top wall part is symmetrical to the area of the mounting zone at the front wall part; and
    a cover coupled to the mounting zone of said shell body and provided with a coupling portion corresponding to the coupling portion of the mounting zone of said shell body;
    wherein the mounting zone is provided with a first row of through holes that are arranged in a line and formed in the mounting zone at the front wall part and a second row of through holes that are arranged in a line and formed in the mounting zone at the top wall part; and
    wherein the first row of through holes and the second row of through holes are symmetrically arranged relative to an imaginary line which is an imaginary intersection of the top and front walls of said shell body.

* * * * *